US011478736B2

(12) United States Patent
Chastain, Jr. et al.

(10) Patent No.: US 11,478,736 B2
(45) Date of Patent: Oct. 25, 2022

(54) PRECLEANER ARRANGEMENT FOR USE IN AIR FILTRATION AND METHODS

(71) Applicant: Donaldson Company, Inc., Bloomington, MN (US)

(72) Inventors: John H. Chastain, Jr., Minneapolis, MN (US); Daryl L. Quam, Minneapolis, MN (US); Eric P. O'Hara, Minneapolis, MN (US)

(73) Assignee: Donaldson Company Inc., Bloomington, MN (US)

( * ) Notice: Subject to any disclaimer, the term of this patent is extended or adjusted under 35 U.S.C. 154(b) by 0 days.

(21) Appl. No.: 17/046,915

(22) PCT Filed: Apr. 24, 2019

(86) PCT No.: PCT/US2019/028944
§ 371 (c)(1),
(2) Date: Oct. 12, 2020

(87) PCT Pub. No.: WO2019/221884
PCT Pub. Date: Nov. 21, 2019

(65) Prior Publication Data
US 2021/0370209 A1    Dec. 2, 2021

Related U.S. Application Data

(60) Provisional application No. 62/673,583, filed on May 18, 2018.

(51) Int. Cl.
*B01D 50/00*    (2022.01)
*B01D 45/16*    (2006.01)
(Continued)

(52) U.S. Cl.
CPC ......... *B01D 45/16* (2013.01); *F02M 35/0216* (2013.01); *F02M 35/0223* (2013.01); *B01D 2279/60* (2013.01); *B04C 2003/006* (2013.01)

(58) Field of Classification Search
CPC ............... B01D 45/16; B01D 2279/60; F02M 35/0216; F02M 35/0223; B04C 2003/006
See application file for complete search history.

(56) References Cited

U.S. PATENT DOCUMENTS 2,936,043 A * 5/1960 Armstrong ................ B04C 5/13
                                                    55/416
3,517,821 A * 6/1970 Keller ....................... B04C 5/06
                                                    210/512.1
(Continued)

FOREIGN PATENT DOCUMENTS

GB          237895 A       11/1925
GB         2500059 A        9/2013
(Continued)

OTHER PUBLICATIONS

International Search Report and Written Opinion for PCT/US2019/028944, dated Aug. 9, 2019.
(Continued)

*Primary Examiner* — Dung H Bui
(74) *Attorney, Agent, or Firm* — Merchant & Gould P.C.

(57) ABSTRACT

A precleaner arrangement for separating a portion of entrained material from air flow air entering an engine air cleaner. The precleaner arrangement includes a precleaner housing and at least a first flexible air deflection vane with a fixed portion secured to the precleaner housing and a deflectable portion. The deflectable portion includes a curved section extending from the fixed portion and a tail section extending from the curved section. The deflectable portion is configured to deflect in response to a sufficient air flow rate change through the precleaner arrangement, in use. Some arrangements will also include a second stage, outlet vane assembly.

24 Claims, 16 Drawing Sheets

(51) Int. Cl.
*F02M 35/02* (2006.01)
*F02M 35/022* (2006.01)
*B04C 3/00* (2006.01)

(56) References Cited

U.S. PATENT DOCUMENTS

| | | | | |
|---|---|---|---|---|
| 3,825,212 A * | 7/1974 | Darges | B64D 13/08 | 244/118.5 |
| 3,961,923 A * | 6/1976 | Zia Rouhani | G21C 15/16 | 55/457 |
| 3,988,132 A * | 10/1976 | Oranje | B01D 45/16 | 55/399 |
| 4,127,396 A * | 11/1978 | Tortorici | B01D 45/16 | 55/396 |
| 4,162,906 A * | 7/1979 | Sullivan | B04C 3/04 | 55/346 |
| 4,420,314 A * | 12/1983 | Barron, Jr. | B04C 5/06 | 55/436 |
| 4,537,608 A * | 8/1985 | Koslow | B01D 46/48 | 55/337 |
| 4,629,481 A * | 12/1986 | Echols | B01D 45/16 | 122/34 |
| 4,966,703 A * | 10/1990 | Kalnins | B01D 17/0217 | 210/512.1 |
| 5,186,607 A * | 2/1993 | Yang | F01D 9/02 | 415/183 |
| 6,280,493 B1 * | 8/2001 | Eubank | B01D 45/14 | 55/398 |
| 6,540,917 B1 * | 4/2003 | Rachels | B04C 3/00 | 210/512.1 |
| 6,666,338 B1 | 12/2003 | Henriksson et al. | | |
| 6,702,877 B1 * | 3/2004 | Swanborn | B01D 45/16 | 95/269 |
| 7,258,713 B2 * | 8/2007 | Eubank | F02M 35/022 | 55/401 |
| 7,311,744 B2 * | 12/2007 | Elliott | B01D 45/16 | 55/396 |
| 7,364,601 B2 | 4/2008 | Xu et al. | | |
| 8,002,866 B2 * | 8/2011 | Kondo | F22B 37/327 | 55/457 |
| 8,657,895 B2 * | 2/2014 | Kline | F02C 7/055 | 55/306 |
| 8,945,283 B1 * | 2/2015 | Krishnamurthy | B04C 3/04 | 95/269 |
| 8,951,337 B2 | 2/2015 | Tofsland et al. | | |
| 10,792,677 B2 * | 10/2020 | Maduta | B04C 5/081 | |
| 10,807,030 B2 * | 10/2020 | Nie | B01D 45/12 | |
| 10,857,496 B2 * | 12/2020 | Nie | B01D 53/78 | |
| 2007/0137152 A1 * | 6/2007 | Xu | B01D 50/002 | 55/321 |
| 2007/0234691 A1 * | 10/2007 | Han | B04C 5/06 | 55/457 |
| 2009/0016872 A1 * | 1/2009 | Anghileri | B64D 33/02 | 415/121.2 |
| 2009/0050105 A1 * | 2/2009 | Shibata | B01D 45/16 | 123/306 |
| 2009/0101013 A1 | 4/2009 | Moredock | | |
| 2009/0205489 A1 * | 8/2009 | Miemiec | B01D 46/0024 | 95/35 |
| 2010/0140187 A1 * | 6/2010 | Schook | B04C 3/06 | 210/788 |
| 2012/0134832 A1 * | 5/2012 | Wu | A61M 60/205 | 416/198 R |
| 2012/0234168 A1 * | 9/2012 | Tofsland | B01D 45/16 | 95/268 |
| 2013/0318933 A1 * | 12/2013 | Ciccarelli | B04C 3/06 | 55/337 |
| 2014/0013764 A1 * | 1/2014 | Biagioli | F23R 3/14 | 60/748 |
| 2014/0124224 A1 * | 5/2014 | Berghuijs | B01D 50/002 | 169/70 |
| 2014/0298761 A1 * | 10/2014 | Ackermann | B01D 45/16 | 55/457 |
| 2014/0299540 A1 * | 10/2014 | Ackermann | B04C 3/06 | 210/512.3 |
| 2015/0047304 A1 * | 2/2015 | Son | B04C 3/06 | 55/418 |
| 2015/0047305 A1 | 2/2015 | Altorf et al. | | |
| 2015/0068169 A1 * | 3/2015 | Schulz | B01D 45/12 | 55/337 |
| 2015/0157972 A1 * | 6/2015 | Bratten | B01D 46/003 | 95/22 |
| 2016/0177893 A1 * | 6/2016 | Finn | F02M 35/024 | 95/23 |
| 2016/0189810 A1 * | 6/2016 | Mistreanu | F01K 5/00 | 376/371 |
| 2017/0114720 A1 * | 4/2017 | Stone | B01D 45/16 | |
| 2017/0361338 A1 * | 12/2017 | Ni | B01D 45/16 | |
| 2018/0169553 A1 * | 6/2018 | Billiet | B01D 45/16 | |
| 2018/0272264 A1 * | 9/2018 | Ming | B01D 47/025 | |
| 2018/0290153 A1 * | 10/2018 | Bannister | B01D 46/106 | |
| 2018/0369731 A1 * | 12/2018 | Mueller | B04C 3/06 | |
| 2019/0091703 A1 * | 3/2019 | Hyun | B04C 5/04 | |
| 2019/0099766 A1 * | 4/2019 | Krishnamurthy | B04C 3/04 | |
| 2019/0366251 A1 * | 12/2019 | Langen | B01D 50/002 | |
| 2021/0199078 A1 * | 7/2021 | Gomibuchi | F02M 35/084 | |

FOREIGN PATENT DOCUMENTS

| | | |
|---|---|---|
| WO | 2005/040593 A1 | 5/2005 |
| WO | 2013/083452 A1 | 6/2013 |
| WO | 2017/066169 A1 | 4/2017 |
| WO | 2019/054915 A1 | 3/2019 |

OTHER PUBLICATIONS

Office Action for Chinese Patent Application No. 201980032115.X dated Oct. 29, 2021, 10pgs.

* cited by examiner

PRECLEANER ARRANGEMENT FOR USE IN AIR FILTRATION AND METHODS

This application is U.S. National Stage application of PCT International Patent application No. PCT/US2019/028944, filed Apr. 24, 2019, which claims the benefit of priority to U.S. Provisional patent application Ser. No. 62/673,583, filed May 18, 2018, which applications are incorporated herein by reference. To the extent appropriate, a claim of priority is made to each of the above disclosed applications.

TECHNICAL FIELD

This disclosure relates to air filtration. In particular, this disclosure relates to precleaner assemblies for air cleaners, which provide for a precleaning to remove dust or other material from the air prior to the air being passed through filter media within an air cleaner.

BACKGROUND

Gas streams often carry material entrained (for example dust or moisture) therein. In many instances, it is desirable to remove some or all of the entrained material from a gas flow stream. For example, air intake streams to engines for motorized vehicles, construction equipment or for power generation equipment, often include moisture or particulate material therein. The particulate material, should it reach the internal workings of the various mechanisms involved, can cause substantial damage thereto. The moisture can also damage equipment. It is therefore preferred, for such systems, to reduce the level of particulate and moisture in the gas flow upstream of the engine or other equipment involved. A variety of air filter arrangements have been developed for such removal. In general, however, continued improvements are sought.

SUMMARY

A precleaner arrangement is provided which improves the prior art.

In one aspect, a precleaner arrangement is provided for separating a portion of entrained material from air flow air entering an engine air cleaner. The precleaner arrangement includes a precleaner housing and at least a first flexible air deflection vane with a fixed portion secured to the precleaner housing and a deflectable portion. The deflectable portion includes a curved section extending from the fixed portion and a tail section extending from the curved section.

The fixed portion of the first air deflection vane can define an upper terminal edge (i.e, leading edge). The deflectable portion of the first air deflection vane can define a perimeter including an inner side edge and outer side edge and a lower terminal edge bridging the inner and outer side edges. Each of the inner and outer side edges extends from the fixed portion. The tail section defines the lower terminal edge (i.e., trailing edge).

In example embodiments, the curved section has a center of curvature along the inner side edge and a center of curvature along the outer side edge. The center of curvature along the inner side edge is spaced from the upper terminal edge a greater axial distance than the center of curvature along the outer side edge is spaced from the upper terminal edge.

In example embodiments, the precleaner housing has a central hub with a central longitudinal axis passing therethrough. The lower terminal edge is angled at a non-zero and non-perpendicular angle relative to a plane orthogonal to the central longitudinal axis.

In example embodiments, the tail section defines an inner corner at an intersection of the inner side edge and the lower terminal edge, and an outer corner at an intersection of the outer side edge and the lower terminal edge. The outer corner is axially spaced closer to the upper terminal edge than the inner corner is from the upper terminal edge.

In one or more embodiments, the tail section defines an inner corner at an intersection of the inner side edge and the lower terminal edge, and an outer corner at an intersection of the outer side edge and the lower terminal edge. The outer corner is angled from a plane orthogonal to the central longitudinal axis at a first non-zero angle; and the inner corner is angled from a plane orthogonal to the central longitudinal axis at a second non-zero angle.

In some embodiments, the first angle and the second angle are equal.

In some embodiments, the second angle is not greater than the first angle.

In some embodiments, the first angle and second angle range between 15° and 60°.

In some embodiments, the first angle is greater the second angle.

Some implementations include the tail section having a radial thickness greater at the inner side edge and decreasing in thickness to the outer side edge.

Some embodiments include the thickness at the inner side edge being up to ten times the thickness of the outer side edge.

In some arrangements, the precleaner housing has a central hub; and the at least first flexible air deflection vane includes a plurality of flexible air deflection vanes positioned around the central hub, each with a fixed portion secured to the precleaner housing and a deflectable portion. The deflectable portion of each vane includes a curved section extending from the fixed portion and a tail section extending from the curved section. The deflectable portion of each vane is configured to deflect in response to a sufficient air flow rate increase through the precleaner arrangement, in use.

In some arrangements, the precleaner housing further includes an outer ring, and each of the flexible air deflection vanes is positioned between the outer ring and the central hub. Each flexible air deflection vane is secured to the central hub and outer ring at the fixed portion of each vane.

In some embodiments, there are at least six flexible air deflection vanes.

In some arrangements, there are at least ten flexible air deflection vanes.

In one or more embodiments, the tail section of each flexible air deflection vane has a variable thickness in a radial direction. A largest thickness being along the central hub and lessoning to a portion of the vane next to the outer ring.

In some implementations, the plurality of flexible air deflection vanes circumferentially overlap.

In some implementations, the circumferential overlap of the vanes is no greater than 60°, as measured from the central hub.

In many examples, each of the fixed portions of the flexible air deflection vanes defines an upper terminal edge, and each of the deflectable portions of the air deflection vanes defines a perimeter. The perimeter includes an inner side edge and an outer side edge and a lower terminal edge bridging the inner and outer side edges. Each of the inner and outer side edges extend from the fixed portion. The tail section defines the lower terminal edge.

Many arrangements include an inner radial gap defined between each of the inner side edges and the central hub, and an outer radial gap defined between each of the outer side edges and the outer ring.

In some embodiments, each of the flexible air deflection vanes has a width extending between the inner side edge and the outer side edge. The inner radial gap has a width that is no more than 50% of the width of each vane. The outer radial gap has a width that is no more than 50% of the width of each vane.

In many implementations, the at least first flexible air deflection vane comprises in the inlet vane system. The precleaner arrangement can further include an outlet vane system downstream of the inlet vane system. The outlet vane system may have a plurality of rigid vanes fixed to the precleaner arrangement.

The inlet vane system may induce a vortical air flow in one of a clockwise or counterclockwise direction, while the outlet vane system will reverse the vortical air flow of the inlet vane system.

The deflectable portion can be configured to deflect in response to a sufficient air flow rate change through the precleaner arrangement, in use.

In another aspect, a precleaner arrangement for separating a portion of entrained material from air flow air entering an engine air cleaner is provided. The precleaner arrangement includes a precleaner housing; an inlet vane component; and an outlet vane system. The inlet vane system is in the precleaner housing and is arranged to induce a vortical air flow in one a clockwise or counterclockwise direction. The outlet vane system is arranged to reverse the vortical air flow of the inlet vane system.

In some embodiments, the inlet vane system comprises a plurality of flexible air deflection vanes, each having a fixed portion secured to the precleaner housing and a deflectable portion. The deflectable portion includes a curved section extending from the fixed portion and a tail section extending from the curved section. The deflectable portion is configured to deflect in response to a sufficient air flow rate increase through the precleaner arrangement, in use.

In some implementations, the precleaner housing has a central hub and the plurality of flexible air deflection vanes are secured to and positioned around the central hub.

In some example embodiments, the outlet vane system comprises a plurality of rigid vanes secured to and positioned around the central hub.

Methods of precleaning air are provided and include providing and directing air flow through arrangements as characterized above.

Examples of dimensions, configurations, and materials are provided to indicate various ways in which principles of this disclosure can be implemented.

DETAILED DESCRIPTION

Figure 1:
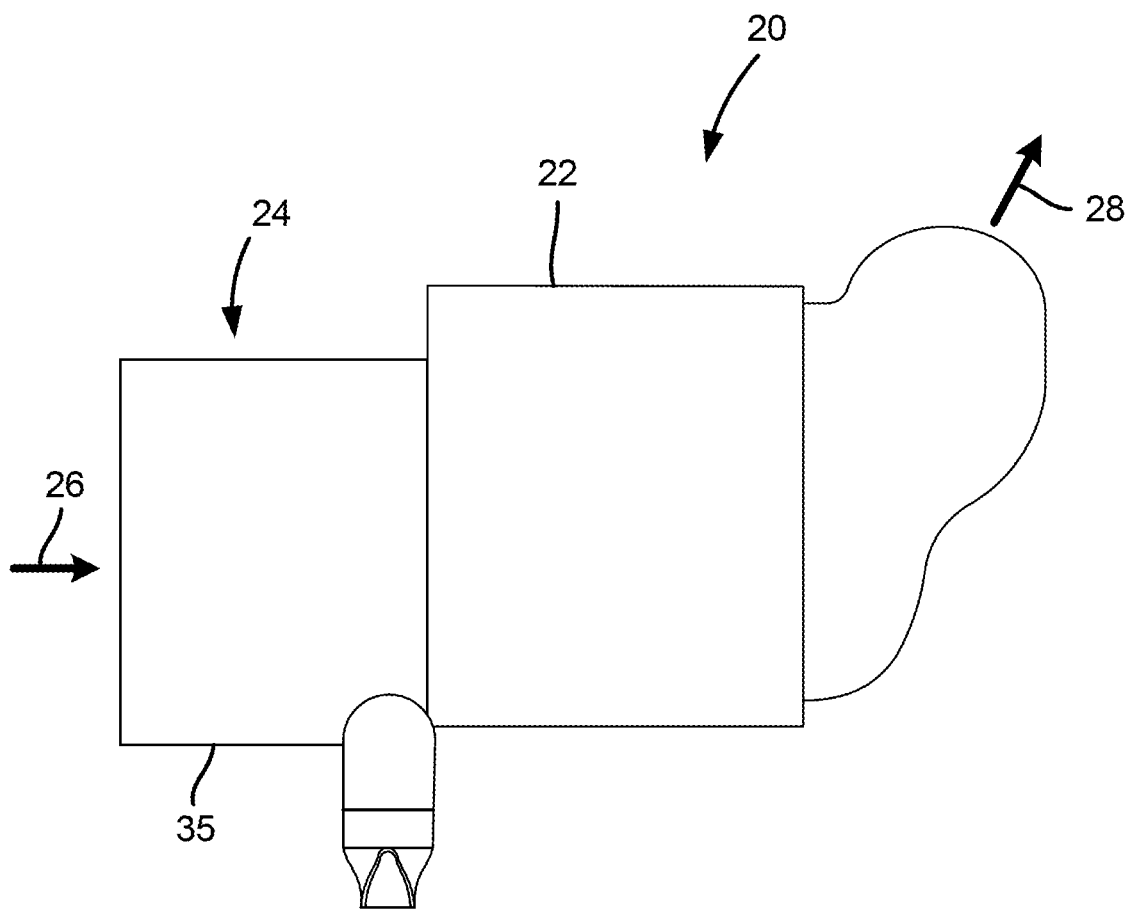
FIG. 1 is a schematic view of a precleaner and air cleaner for use with an engine.

FIG. 1 depicts a schematic view of an air cleaner assembly 20 of the type typically used for filtering engine intake air for internal combustion engines. The air cleaner assembly 20 can include a main air cleaner 22. Upstream of the main air cleaner 22 is a precleaner arrangement 24. In alternative systems, the precleaner arrangement 24 can operate as the sole air cleaner, and no main air cleaner is needed downstream.

The main air cleaner 22 typically will have a serviceable air filter or air filter element, which can be removed and replaced.

In typical operation, air enters the air cleaner assembly 20 by entrance into the precleaner arrangement 24 in the direction arrow 26. The air exits the air cleaner 22 in the direction of arrow 28, to be directed to an engine intake manifold, or other equipment structure.

The precleaner arrangement 24 allows for separation of a portion of dust or other material entrained within air to be cleaned, prior to the air passing through the air filter element within the main air cleaner 22. The precleaner arrangement 24 generally operates by imparting a circular, vortical or coiled momentum to the incoming air including the entrained material, as opposed to passage of the air through a filter media. This vortical or coiled momentum causes a deposition or separation of a portion of the entrained material from the air flow, before the air is transferred into the main air cleaner 22, which includes the filter element.

Precleaners generally provide restriction to air flow. The reason for this is that the vanes (sometimes referred to as blades or fins) which divert the air into a circular or vortical pattern generally need to be positioned an extension across the direction of inlet air flow 26 to impart the desired tangential momentum to the flow. This causes restriction. The precleaner arrangement 24 of the present disclosure is helpful in reducing restriction that is typical of many types of prior art precleaners.

Figure 2:
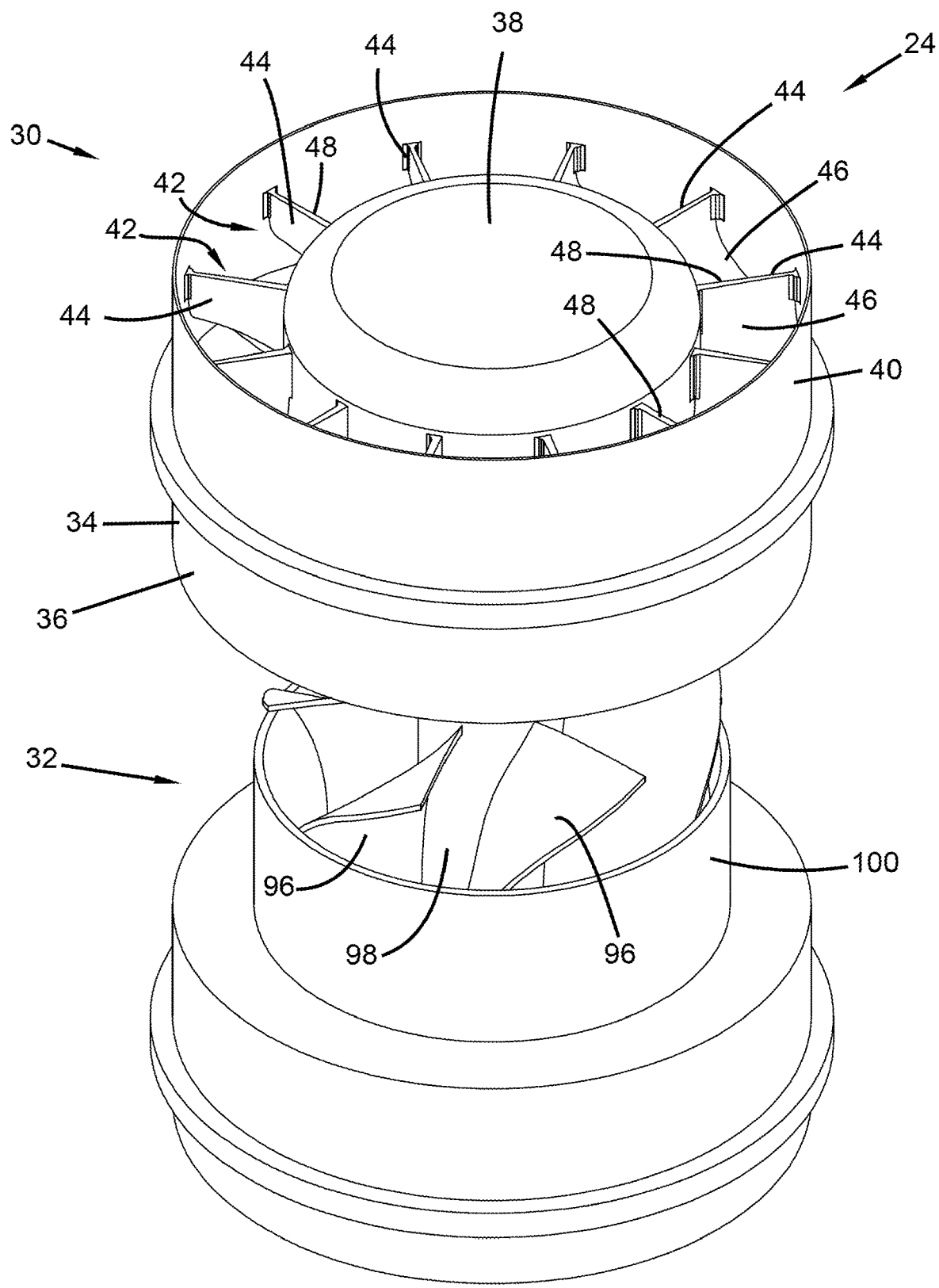
FIG. 2 is a perspective view of a precleaner usable in FIG. 1, and showing an inlet vane system and outlet vane system, constructed in accordance with principles of this disclosure.
Figure 3:
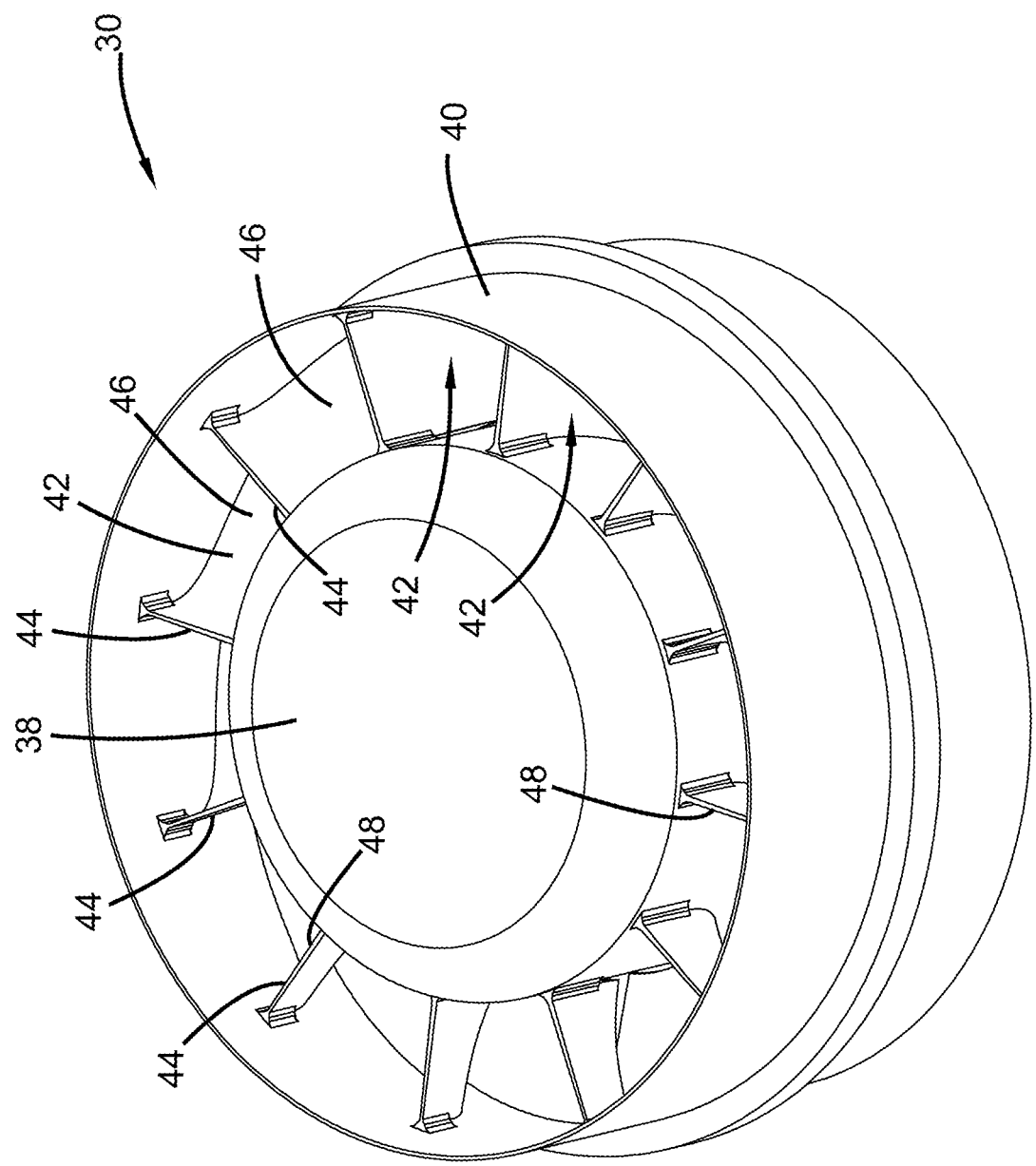
FIG. 3 is a perspective view of the inlet vane system of FIG. 2.

One example embodiment of precleaner arrangement 24 is shown in FIG. 2. In general, the precleaner arrangement 24 has an inlet vane assembly 30 with vanes that flex under the load applied by the fluid (incoming air) on the vane surface. The inlet vane assembly 30 is designed to a low flow condition and passably flexes as flow rate increases to a higher flow condition, resulting in a lower pressure drop than a fixed vane would and maintaining particle separation performance in a pre-specified, e.g. about 4:1, turn down ratio situation. While the inlet vane assembly 30 can be used alone or independently with the main air cleaner 22, many preferred embodiments will additionally include an outlet vane assembly 32 to help with efficiency and pressure drop.

The precleaner arrangement 24 includes precleaner housing 34. An exterior of the precleaner housing 34 is shown at 35 in FIG. 1, while interior components 36 are shown in FIG. 2. The exterior 35 of the housing 34 contains within it the inlet vane assembly 30. Embodiments that also include the outlet vane assembly 32 will also have the outlet vane assembly 32 in an interior portion of the housing 34.

In this embodiment, the housing 34 has a central hub 38 and an outer skirt or ring 40. The outer ring 40 surrounds or circumscribes the hub 38.

There is at least a first flexible air deflection vane 42 secured to the precleaner housing 34.

Figure 4:
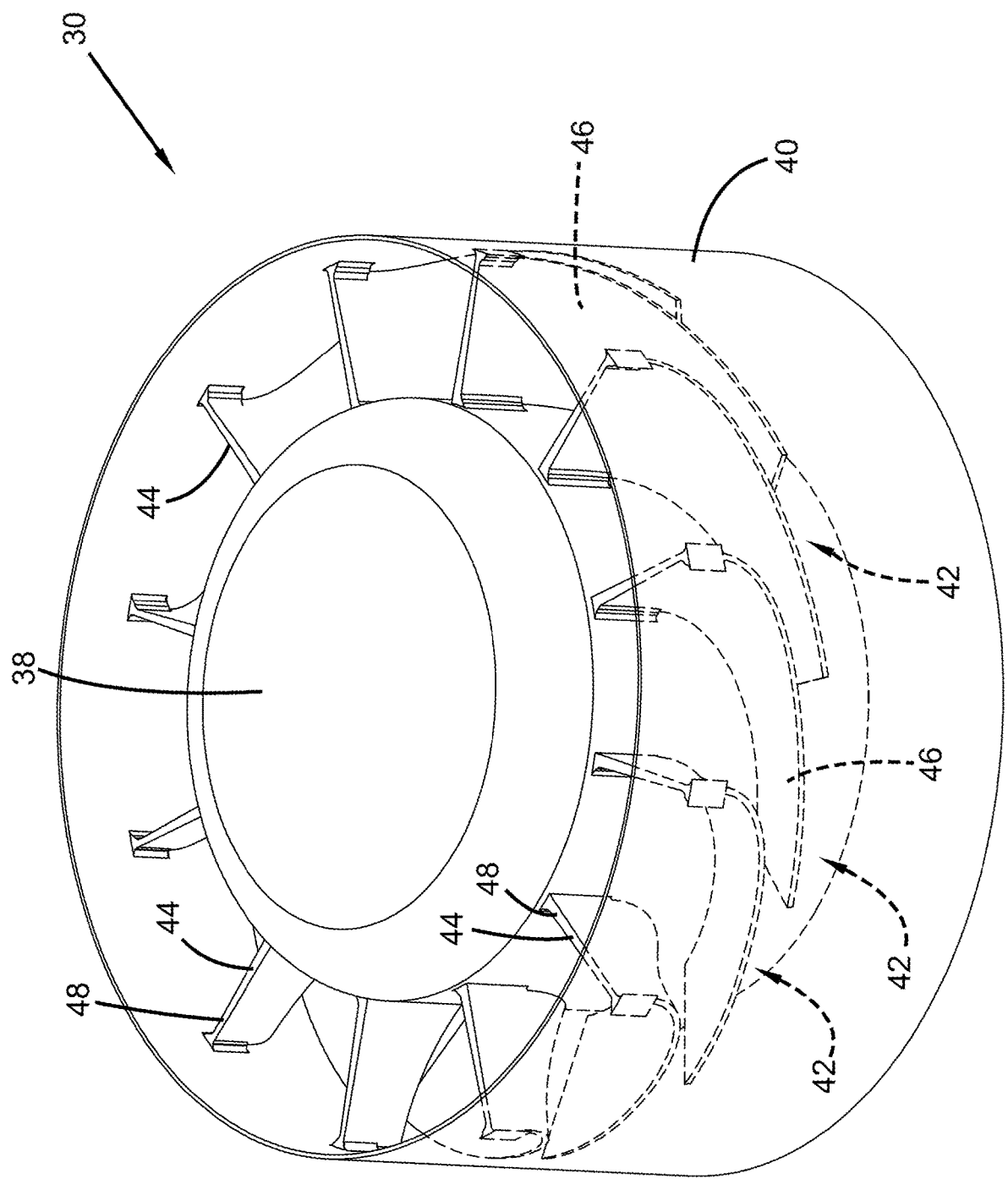
FIG. 4 is another perspective view of the inlet vane system of FIG. 3.
Figure 5:
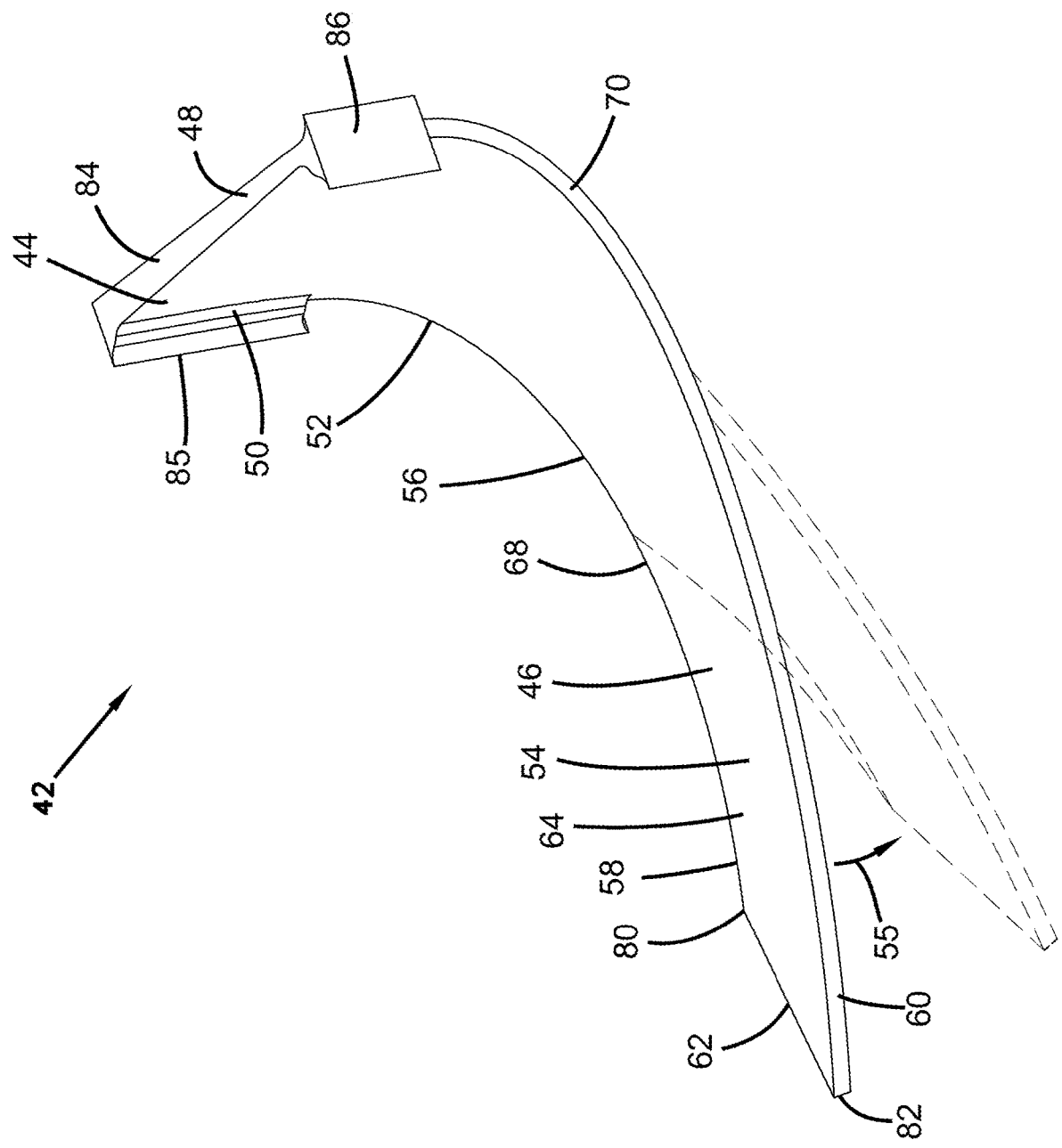
FIG. 5 is a perspective view of one of the vanes used in the inlet vane system of FIGS. 3 and 4 in a relaxed and unrelaxed state.

In reference now to FIGS. 4 and 5, the first flexible air deflection vane 42 has a fixed portion 44 and a deflectable portion 46. The fixed portion 44 is secured to the housing 34. While many different embodiments are possible, in the one shown, the vane 42 is positioned between the outer ring 40 and the central hub 38. The fixed portion 44 can be secured to the hub 38 and the outer ring 40. FIG. 4 shows the inlet vane assembly 30 having a plurality of flexible air deflection vanes 42 positioned around the central hub 38, each having the fixed portion 44 cured to the precleaner housing 34. In FIG. 4, the air deflection vanes 42 are shown in a resting state, with little or no air flow passing therethrough.

Figure 6:
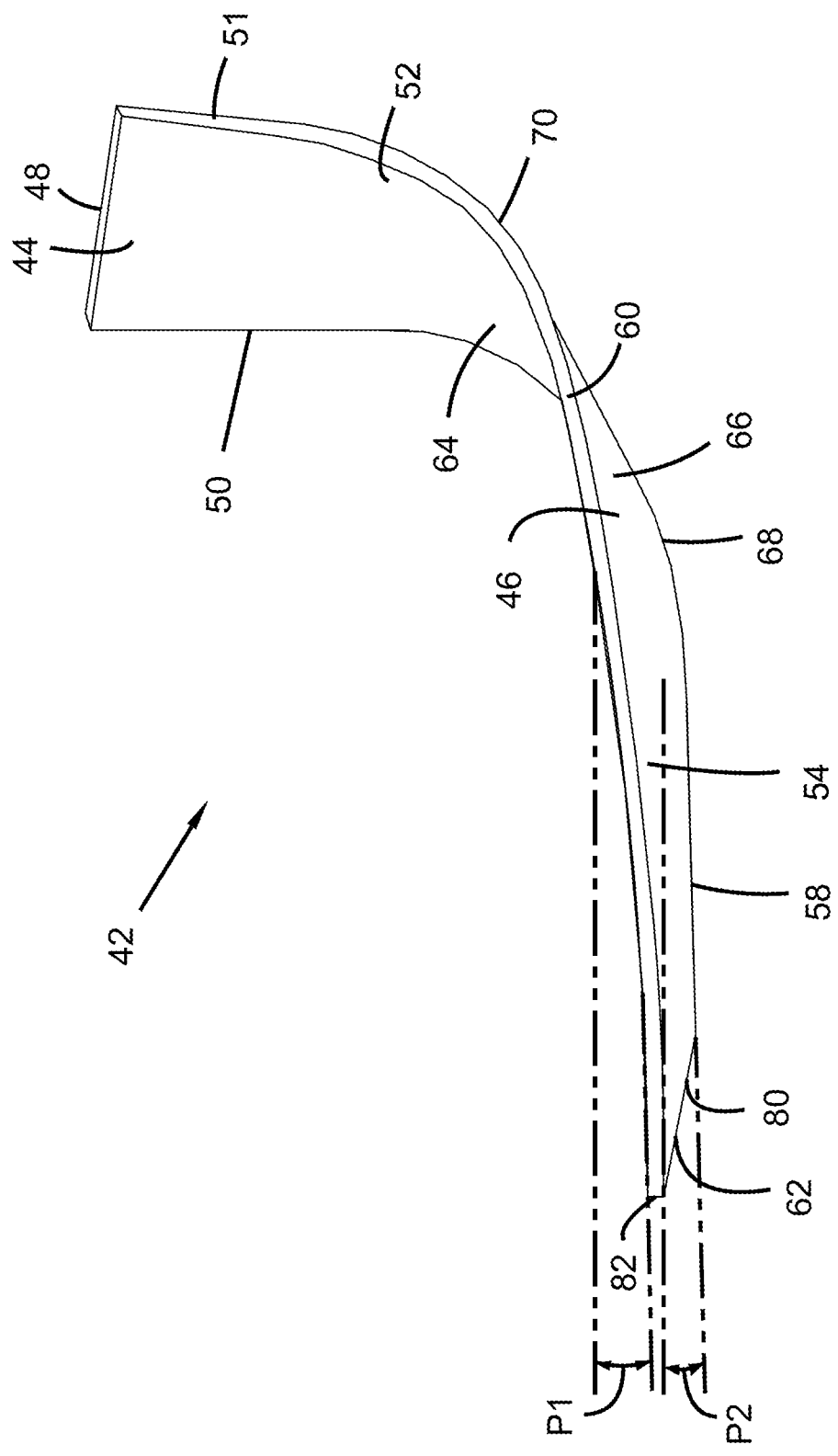
FIG. 6 is a perspective view of one of the vanes used in the inlet vane system of FIGS. 3 and 4.
Figure 7:
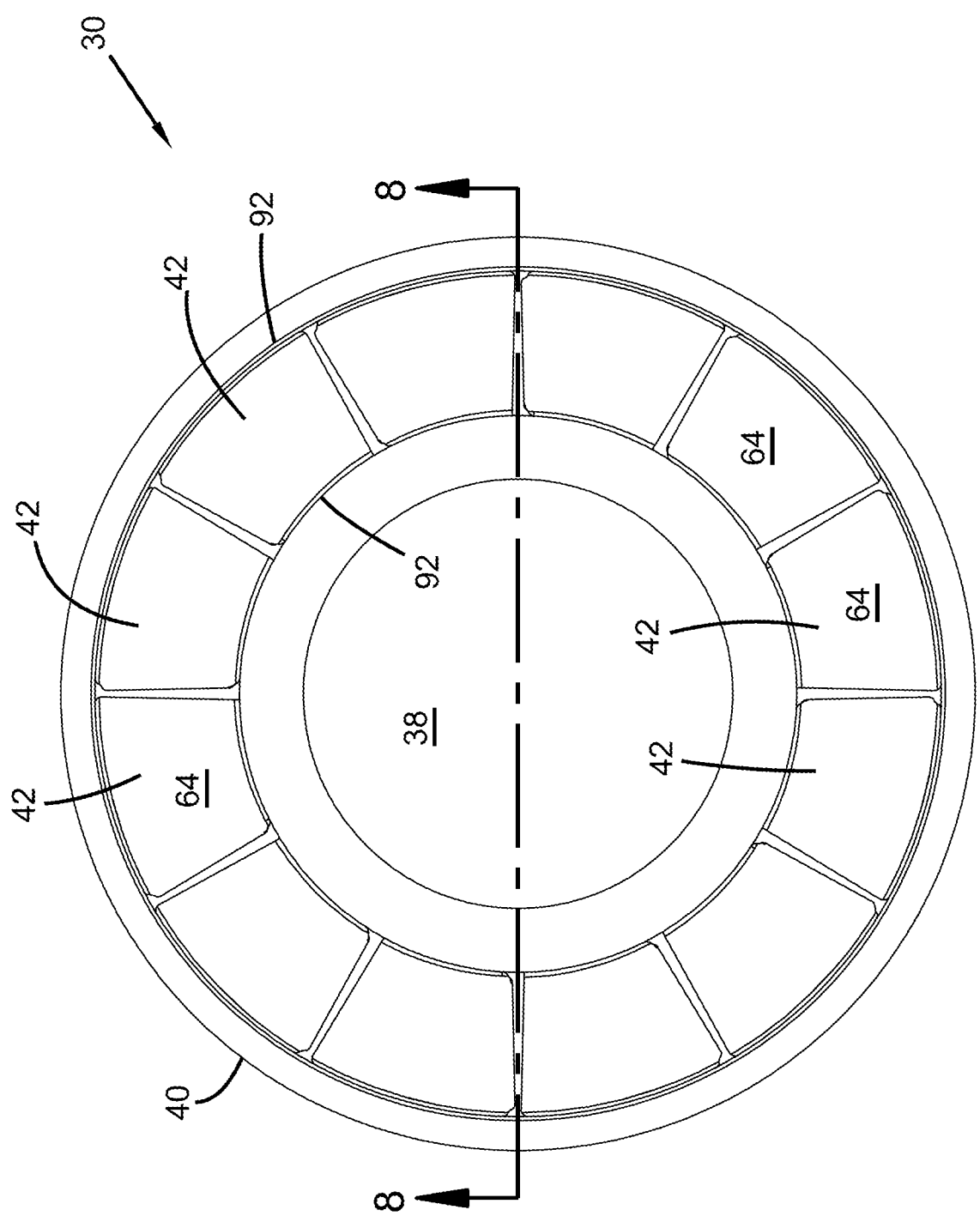
FIG. 7 is a top view of the precleaner arrangement of FIG. 2.

Attention is directed to FIGS. 5 and 6, which show enlarged views of one air deflection vane 42. The fixed portion 44 of the vane 42 defines an upper terminal edge 48. The deflectable portion 46 extends from the fixed portion 44.

The fixed portion 44, in this embodiment, includes opposite leading edges 50, 51. The leading edges 50, 51 are illustrated as generally being straight. The upper terminal edge 48 extends between and bridges the two leading edges 50, 51.

The deflectable portion 46 includes a curved section 52. The curved section 52 extends from the fixed portion 44.

The deflectable portion 46 further includes a tail section 54. The tail section 54 extends from the curved section 52.

The deflectable portion 46 is configured to deflect in response to a sufficient air flow rate increase through the precleaner arrangement 24, in use. In many preferred embodiments, the vane 42 is made of a material so that the deflectable portion 46 has a first orientation and a second orientation. The deflectable portion 46 will have a memory bias toward the first orientation. This first orientation is shown generally in FIG. 4. The second orientation is shown in phantom lines at FIG. 5. In the second orientation, the vanes 42 are deflected along arrow 55 from the orientation of FIG. 4, which allows less air flow to flow through, to the more open orientation, in which there is more open air space between adjacent vanes 42, and which allows more air flow, decreasing the restriction.

Still in reference to FIGS. 5 and 6, in this example embodiment, the deflectable portion 46 defines a perimeter 56. The perimeter 56 includes an inner side edge 58, which is oriented adjacent to the hub 38, and an opposite outer side edge 60, which is oriented adjacent to the outer ring 40. The perimeter 56 further includes a lower terminal edge 62. The lower terminal edge 62 extends or bridges the outer side edges 58, 60. The tail section 54 defines the lower terminal edge 62.

In this embodiment, the lower terminal edge 62 is shown as straight. There can be many variations including parabolic, wavy, concave, convex, exponential, or others. The shape of the lower terminal edge 62 can be used to help tune restriction or efficiency.

The inner side edge 58 extends from the fixed portion 44. In this example, the inner side edge 58 extends from the leading edge 50 of the fixed portion 44.

The outer side edge 60 extends from the fixed portion 44. In this example, the outer side edge 60 extends from the leading edge 51 of the fixed portion 44.

As can be seen in FIG. 6, the vane 42 has an upstream surface 64 and an opposite downstream surface 66. The upstream surface 64 is the surface first encountered by the inlet air when passing through the inlet vane assembly 30. The downstream surface 66 is the surface of the vane 42 that is opposite of the upstream surface 64.

As mentioned previously, the deflectable portion 46 includes curved section 52. The curved section 52 connects the leading edges 50, 51 of the fixed portion 44 to the tail section 54. In many arrangements, and in the example embodiment shown, the curved section 52 is designed to adjust for axial flex of the vane 42 and radial flex of the vane 42. In particular, the curved section 52 helps with coarse tuning of radial deflection of the vane 42.

The curved section 52 can have a radius of curvature along the inner side edge 58 which is spaced from the upper terminal edge 48 a different distance than the center of curvature is spaced from the upper terminal edge 58 along the outer side edge 60. In many preferred embodiments, the center a curvature 68 along the inner side edge is spaced from the upper terminal edge 48 an axial distance further than the center of curvature 70 along the outer side edge is spaced from the upper terminal edge 48. This helps to control and allow for axial flex of the vane 42 while tuning the radial flex.

Figure 8:
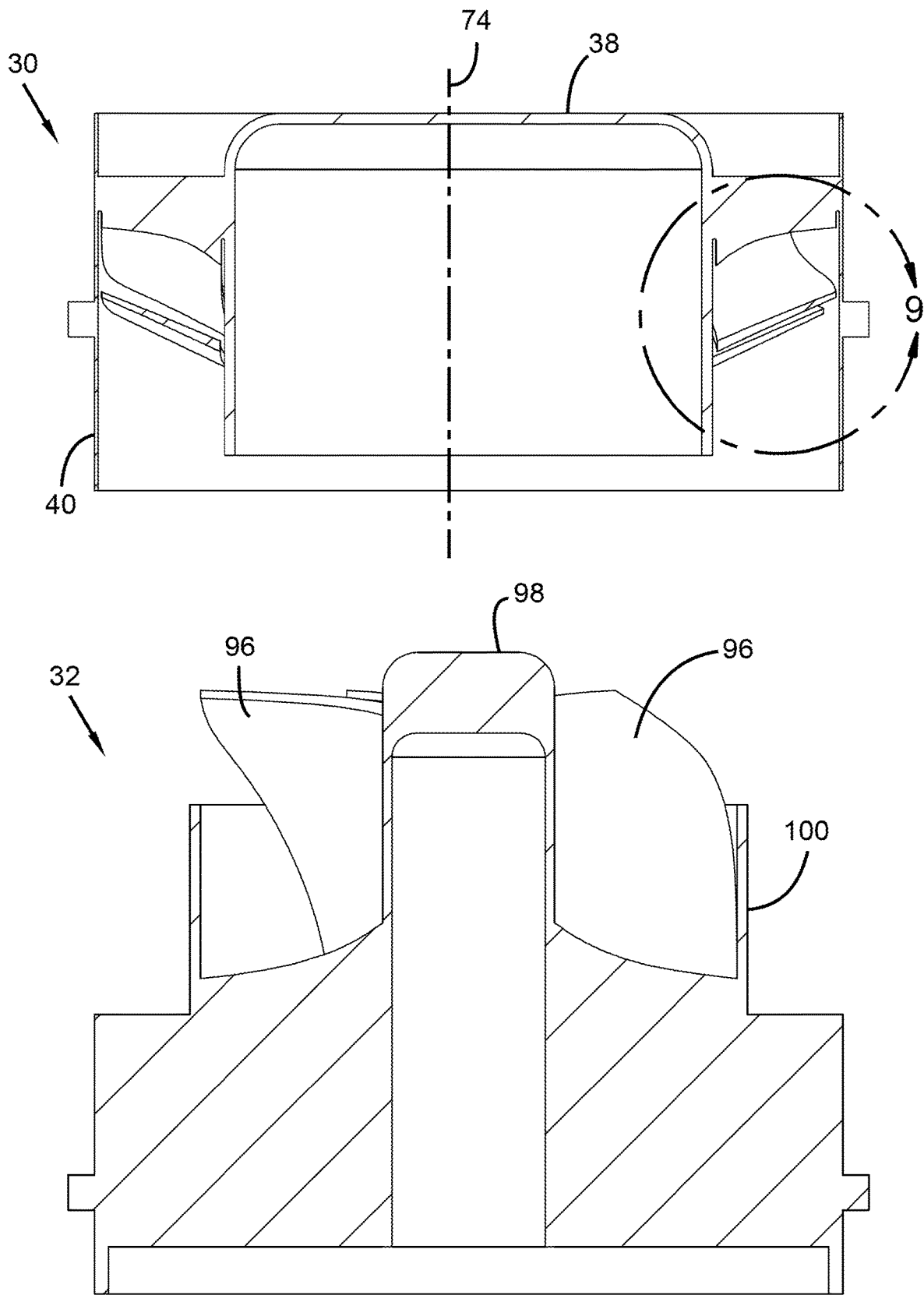
FIG. 8 is a cross-sectional view of the precleaner arrangement of FIG. 7, the cross-section being taken along the line 8-8 of FIG. 7.
Figure 9:
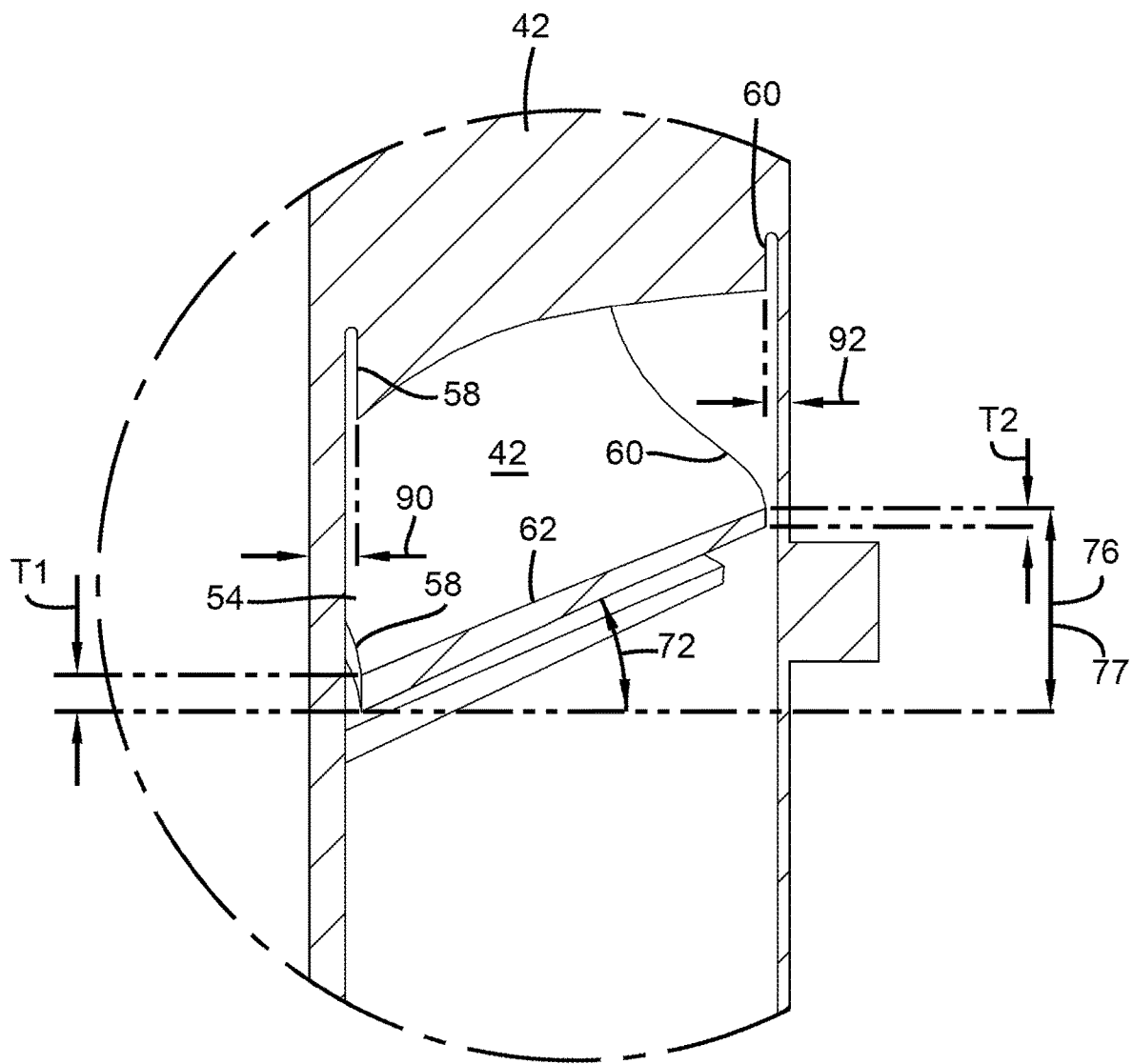
FIG. 9 is an enlarged view of a portion of the inlet vane system shown in FIG. 9.

Attention is directed to FIG. 9, which is an enlarged view of a cross section shown in FIG. 8. The lower terminal edge 62 is shown in cross-section. The lower terminal edge 62 is angled at a non-zero and non-perpendicular angle 72 relative to a plane orthogonal to a central longitudinal axis 74 (FIG. 8) passing through the central hub 38. A difference in height is shown at 76 in FIG. 9 along the lower terminal edge 62 from the inner side edge 68 to the outer side edge 60. This height difference 76 is also referred to as the vane tilt 77.

In reference again to FIG. 5, by reviewing the drawing of the vane 42, it can be appreciated that the tail section 54 defines an inner corner 80 at an intersection of the inner side edge 58 and the lower terminal edge 62. The tail section 54 also defines an outer corner 82 at an intersection of the outer side edge 60 and the lower terminal edge 62. In most preferred embodiments, the vane 42 will include the vane tilt 77 and result in the outer corner 82 being axially spaced closer to the upper terminal edge 48 than the inner corner 80 is spaced from the upper terminal edge 48. The vane tilt 77 will be dependent upon the particular geometry, and in some embodiments, it can be no tilt such that the inner corner 80 and outer corner 82 are even with each other.

The precleaner arrangement 24 may also be designed to control the tangential velocity and vortex shape. One way of doing this is by adjusting the pitch of the vane 42. Attention is directed to FIGS. 6 and 8. FIG. 8 illustrates the central longitudinal axis 74. A plane orthogonal to the central longitudinal axis 74 defines a horizontal plane. In FIG. 6, the outer corner 82 is angled from the plane orthogonal to the central longitudinal axis 74 at a first non-zero angle P1. The inner corner 80 is angled from the plane orthogonal to the central longitudinal axis 74 at a second non-zero angle P2. In many embodiments, the first angle P1 will be greater than the second angle P2. For example, the first angle P1 and second angle P2 can range between 15° and 60°. In some embodiments, the second angle P2 can be equal or about the same as the first angle P1. In most embodiments, the second angle P2 is no greater than equal to the first angle P1. Many embodiments are possible.

As mentioned previously, the positions of the vanes 42 can be adjusted to allow for axial flexing and minimizing radial flexing. The vane tilt 77 is used for coarse tuning of the radial deflection. For fine tuning of the radial deflection, the vanes 42 may have a variable thickness.

FIG. 9 shows a cross-section of one of the vanes 42. In this embodiment, the tail section 54 has a radial thickness T1 which is greatest at the inner side edge 58 and decreases in thickness continuously to the outer side edge 60. The thickness at the outer side edge 60 is shown at T2. Many embodiments are possible. The thickness T1 at the inner side edge 58 may be up to 10 times the thickness T2 at the outer side edge 60. In some applications, the entire vane 42 has a non-uniform thickness.

As can be seen in FIG. 4, the air deflection vanes 42 are positioned around the central hub 38. Each of the vanes 42 has fixed portion 44 secured to the precleaner housing 24. The deflectable portion 46 of each of the vanes 42 is free and unattached to the housing 34.

In the embodiment shown in FIG. 4, each of the vanes 42 is positioned between the outer ring 40 and the central hub 38. In many examples, the vanes 42 are secured to the central hub 38 and the outer ring 40 at the fixed portion 44 of each vane 42.

The vanes 42 can be secured to the housing 34 using a variety of techniques. For example, the vanes 42 can be secured to the hub 38 and outer ring 40 using molding. The molding can be in the form of a single shot mold or in the form of multi-stage injection molding. Other techniques can be used to secure the vanes 42 to the hub 38 and outer ring 40 including interference or snap-fitting, or by use of ultrasonic welding.

FIG. 5 shows a connection piece 84 which forms a part of the upper terminal edge 48 and is part of the fixed portion 44. The connection piece 84 includes an inner side piece 85 adjacent to the hub 38 and an opposite outer side piece 86 adjacent to the outer ring 40. The inner side piece 85 can be the only portion of the vane 42 that is secured to the hub 38. A remaining portion of the vane 42 is free of connection to the hub 38. Similarly, the outer side piece 86 can be the only portion of the vane 42 connected to the outer ring 40, freeing the remaining portion of the vane 42 from any connection to the ring 40. As can be appreciated from FIG. 5, inner side piece 85 is joined by the curved section 52 and the inner side edge 58. The outer side piece 86 is joined by the curved section 52 and the outer side edge 60.

The number of vanes 42 will vary depending upon the inner radius of the outer ring 40 and the modulus of elasticity of the material of the vane 42. In many cases, there are at least six flexible air deflection vanes 42, and in many cases, there can be at least ten flexible air deflection vanes 42. In many cases, there will be fewer than 20 air deflection vanes 42.

Figure 10:
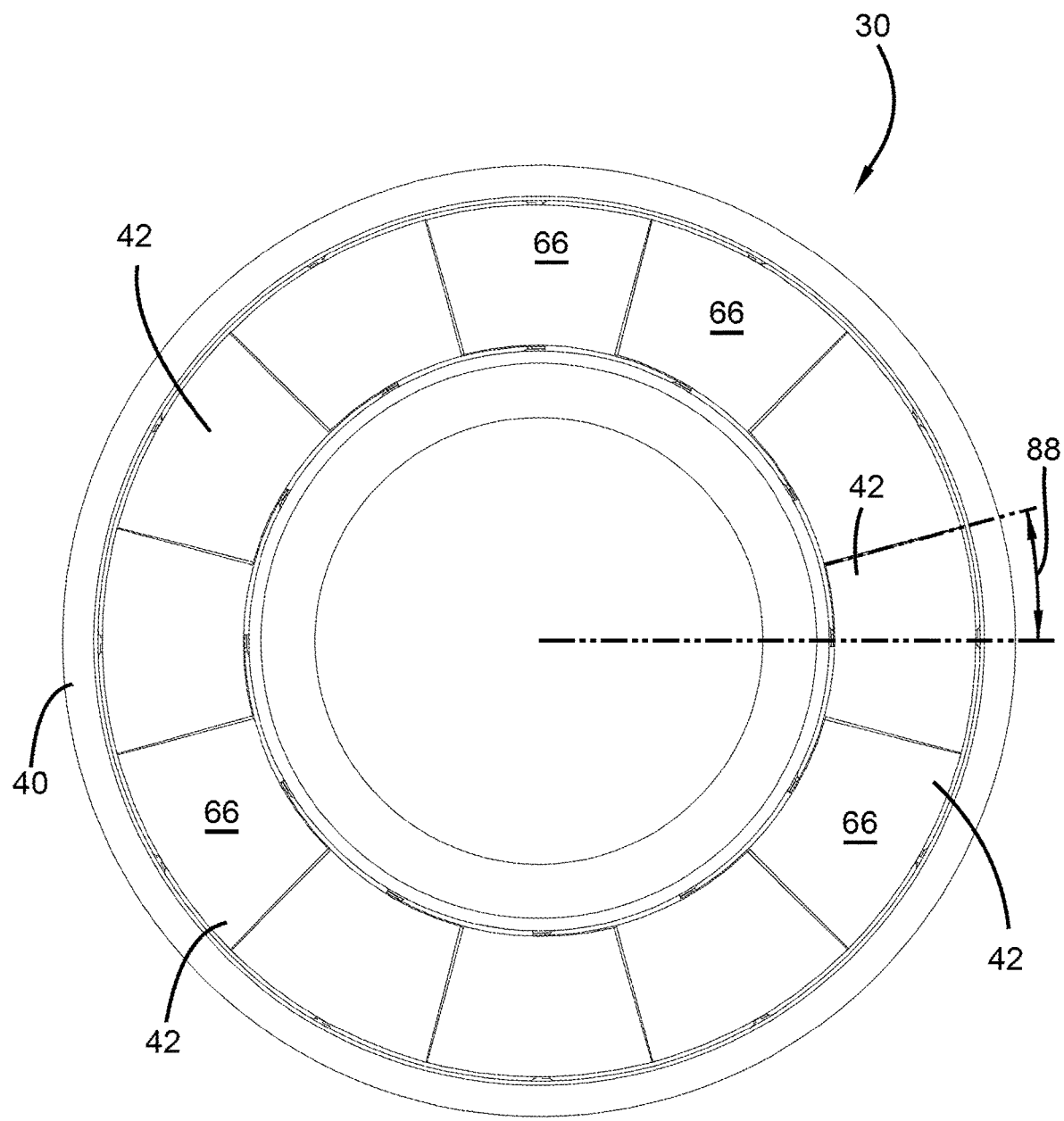
FIG. 10 is a bottom view of the inlet vane system of FIGS. 3 and 4.
Figure 11:
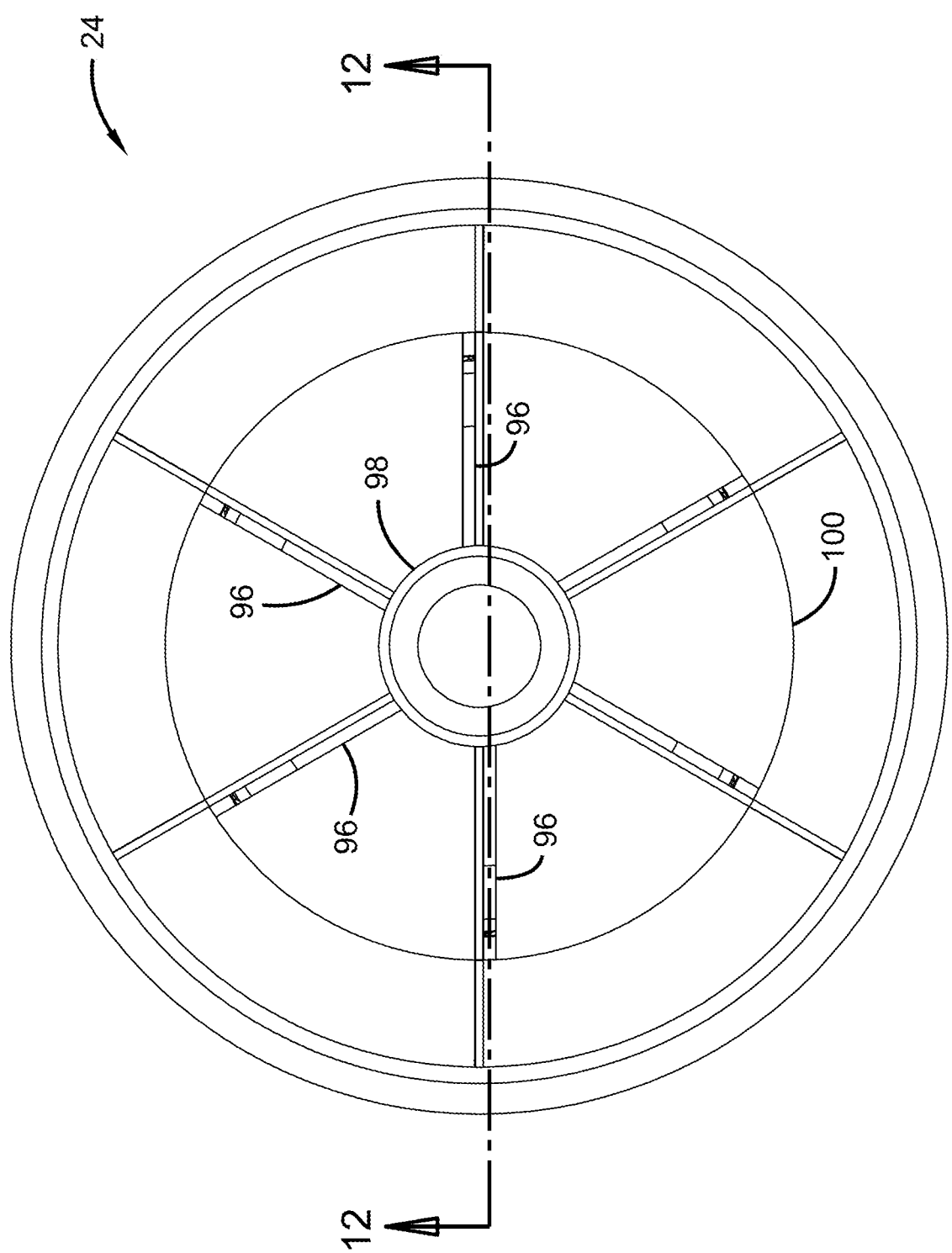
FIG. 11 is a bottom view of the precleaner arrangement of FIG. 2.

The vanes 42 can be arranged around the hub 38 to have a circumferential overlap. The amount of overlap is selected to affect the overall separation efficiency. FIG. 10 is a bottom view of the inlet vane assembly 30. The downstream surfaces 66 of the vanes 42 can be seen. Angle 88 in FIG. 10 illustrates the amount of circumferential overlap of two of the vanes 42. In some cases, there may be no overlap, but rather, open air gaps between adjacent vanes 42. In other cases, the overlap 88 can be no greater than 60° as measured from the central hub 38. In cases where there is separation between the vanes 42, typically there will be about 50° at angle 88.

To allow the deflectable portion 46 of each of the vanes 42 to move and deflect, it is helpful to have an inner radial gap 90 between the inner side edge 58 and the hub 38 (see FIG. 9). It is also helpful to have an outer radial gap 92 (FIG. 9) between each of the outer side edges 60 and the outer ring 40. The size of the gaps 90, 92 is selected to allow for movement of the deflectable portions 42 of the vanes 42, but small enough to minimize air bypass. In many instances, the inner and outer radial gaps, 90, 92 are at a dimension (width) that no more than 50% of the width of each vane 42. The width of each vane 42 is the dimension extending between the inner side edge 58 and outer side edge 60. In some cases, the width of the gaps 90, 92 can be zero so that the edges 58, 60 just barely touch the hub 38 and outer ring 40.

Figure 16:
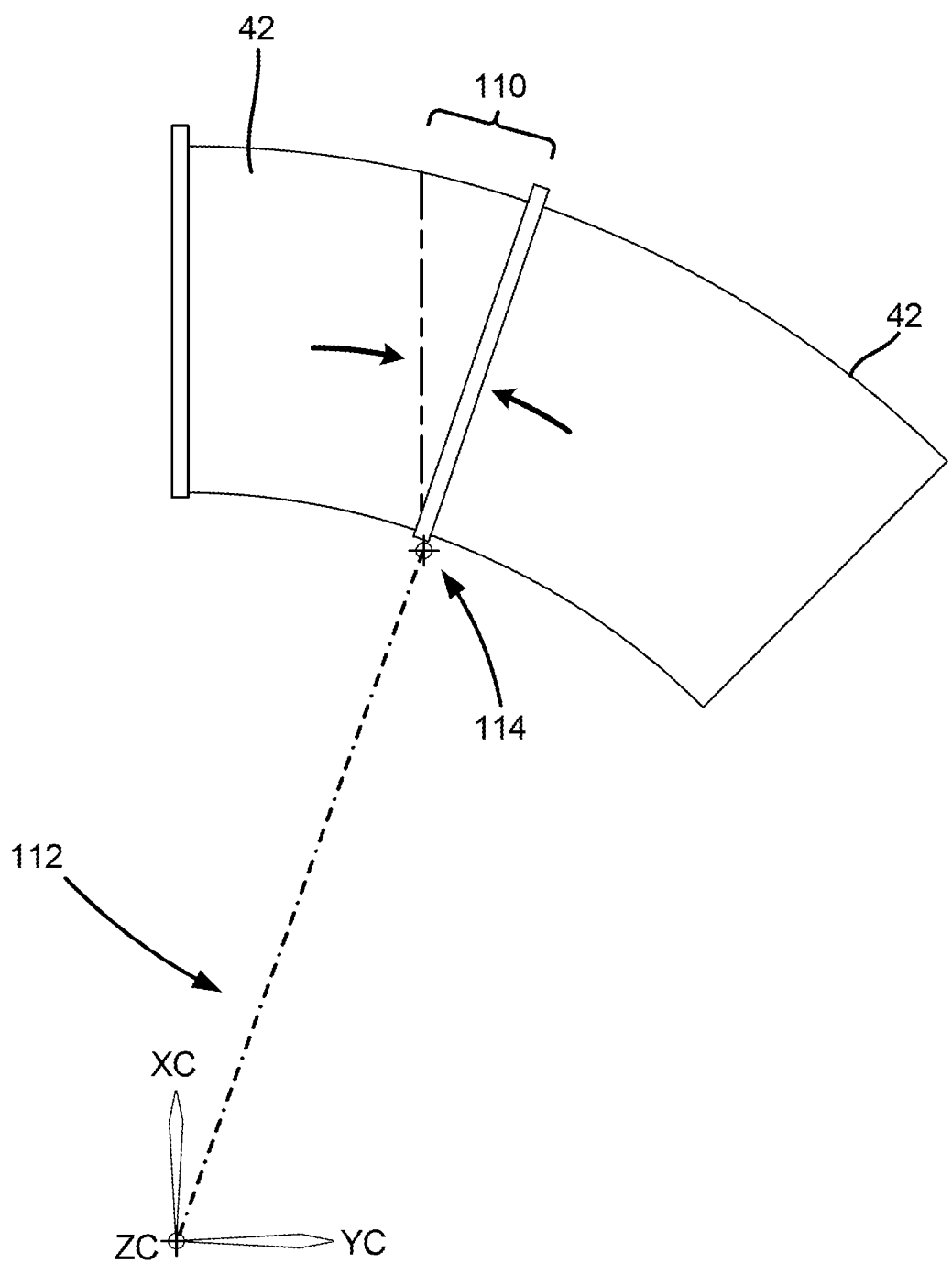
FIG. 16 is a schematic view of two of the inlet vanes and showing a helix trim angle.

FIG. 16 is a schematic view of two of the vanes 42. FIG. 16 shows a helix trim angle at 110. The helix trim angle 110 can be adjusted to tune the radial deflection of the vanes 42 and can be rotated in the positive or negative direction. A plane 112 is defined by the Z-axis (centerline) through the beginning of the pitch curve on the vane 42. The Z axis, coming out of the paper, is illustrated at 114, and it passes through the end point of the pitch curve.

Figure 15:
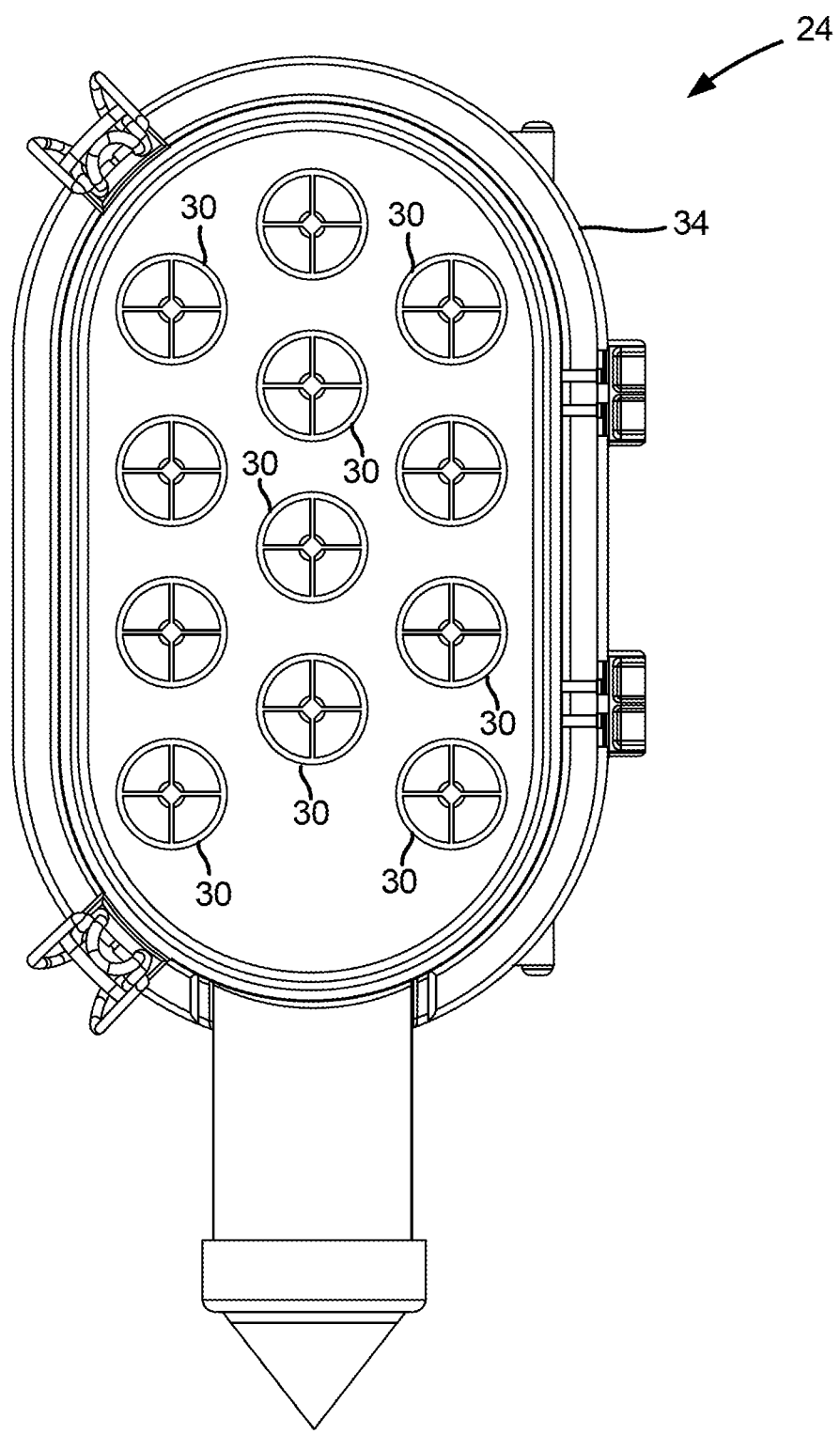
FIG. 15 is an end view of a precleaner, in which several of the inlet vane systems of FIG. 3 are used in parallel to each other.

The precleaner arrangement 24 can include a plurality of inlet vane assemblies 30, arranged within the precleaner housing and in parallel to each other, as illustrated in FIG. 15.

As mentioned previously, the precleaner arrangement 24 includes the inlet vane assembly 30 and may also include an optional outlet vane assembly 32. In systems that include both an inlet vane assembly 30 and outlet vane assembly 32, the use of the flexible vanes 42 in the inlet vane assembly 30 are optional. That is, the precleaner arrangement 24 can include inlet vane assembly 30 and outlet vane assembly 32, wherein the inlet vane assembly 30 has standard, rigid vanes, and not vanes designed to have deflectable portions 46.

The outlet vane assembly 32 can be provided based on the expected flow rate and pitch P1, P2 (FIG. 6) of the inlet vanes 42 in order to recover pressure loss in the precleaner arrangement 24, and the expected scavenge rate relative to the primary flow rate.

Figure 12:
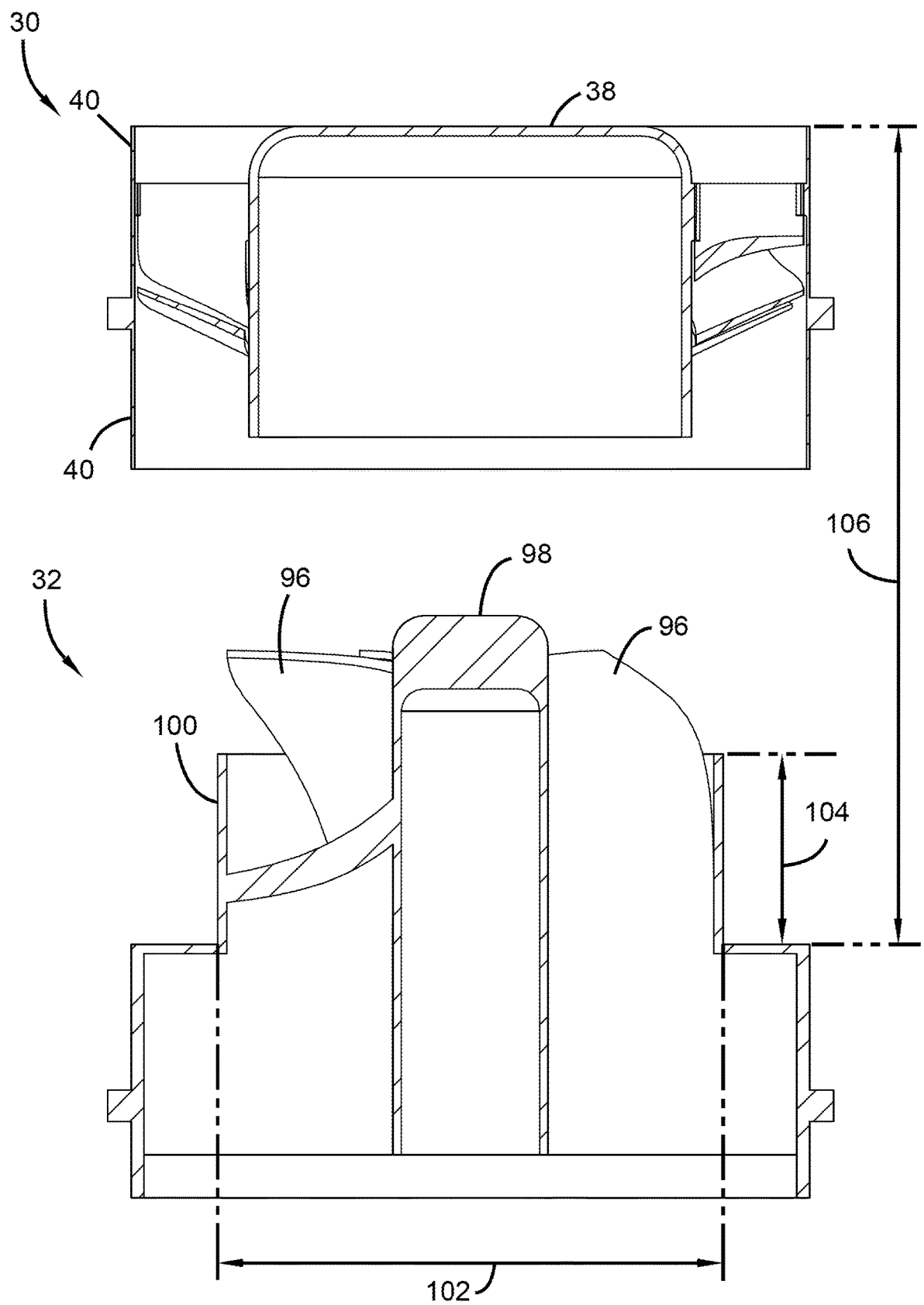
FIG. 12 is a cross-sectional view of the precleaner arrangement of FIG. 11, the cross-section being taken along the line 12-12 of FIG. 11.
Figure 13:
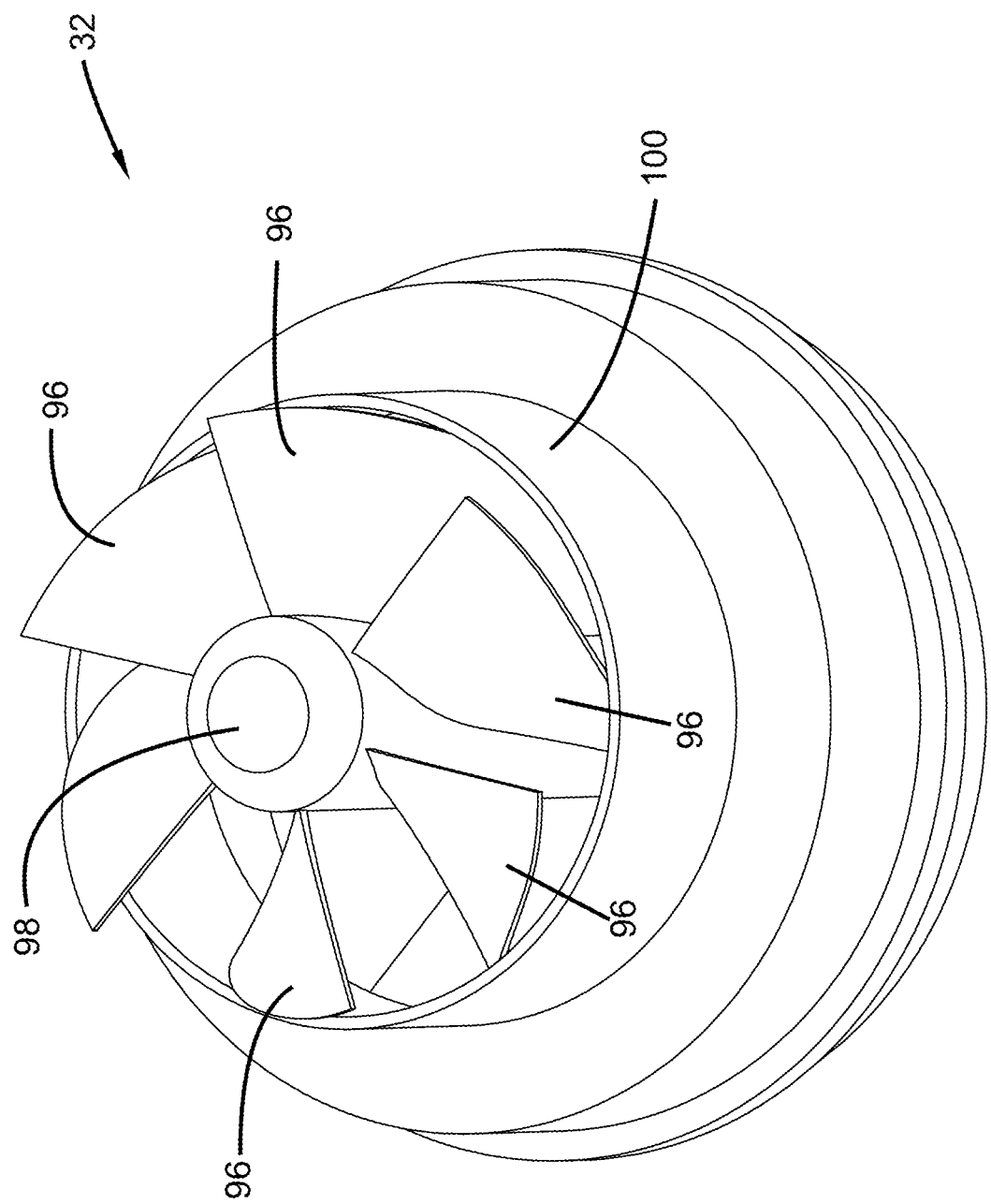
FIG. 13 is a perspective view of the outlet vane system depicted in FIG. 2.
Figure 14:
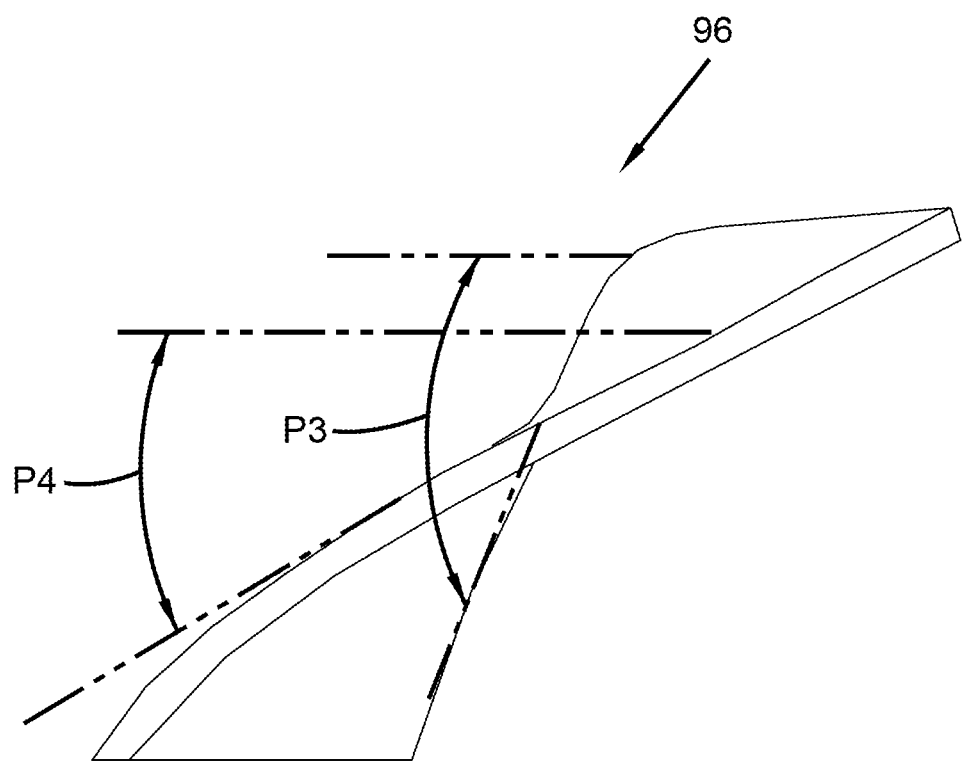
FIG. 14 is a perspective view of one of the outlet vanes used in the outlet vane system of FIG. 13.

FIGS. 12-14 show one example embodiment of the outlet vane assembly 32. The outlet vane assembly 32 includes a plurality of fins or vanes 96 surrounding a central hub 98. Surrounding each of the vanes 96 is an outer ring 100. The ring 100 has a diameter 102 (FIG. 12) that is chosen based upon the desired separation efficiency.

A height of each of the outlet vanes 96 is shown at 104 in FIG. 12. The height 104 will be selected depending upon the method of scavenging and the attachment of the vanes 96 to the hub 98 and also helps with efficiency.

The outlet vane assembly 32 is placed downstream of the inlet vane assembly 30 at a desired baffle to baffle distance 106. This distance 106 will be not greater than ten times the radius of the outer ring 40 of the inlet vane assembly 30. The distance 106 will be at least the height 104 of the ring 100.

The number of outlet vanes 96 can vary, and typically be dependent on the modulus of the vane 96 used and the radius of the ring 40. For example, there can be at least three vanes 96, for example at least five vanes 96, and no greater than 20 vanes 96. In the example shown in FIG. 13, there are six vanes 96.

The vanes 96 can be made to have a pitch, such as shown in FIG. 14. There are two pitches shown in FIGS. 14, P3 and P4. The pitches P3, P4 will be dependent upon the pitches P1, P2 of the inlet vanes 42. In the example shown, the pitches P3, and P4 are multiple times greater than the pitches P1 and P2. The thickness of the vanes 96 can range from 0.2-6.0 mm, for example, 0.25 mm to 5.0 mm.

The vanes 96 in the outlet vane assembly 32 are twisted to oppose the vortical air flow from the direction of air flow that is induced by the inlet vane assembly 30. The inlet vane assembly 30 can be arranged to induce a vortical air flow in one of a clockwise or counter clockwise direction. The outlet vane system 32 is arranged to "de-swirl" or to reverse the direction of vortical air flow of the inlet vane assembly 30. For example, if the inlet vane assembly 30 induces flow in a clockwise direction, when it encounters the vanes 96 of the outlet vane assembly 32, the vanes 96 will work to straighten the air flow and de-swirl it by trying to cause the airflow to go in counter clockwise direction and result in a substantially straight flow.

It should be appreciated that the vanes 42 can be selected to have materials and dimensions that will have an effect on system performance. The deflectable portion 46 of the vanes 42 will be "deflectable." "Deflectable", within this context, will be vanes having a modulus of elasticity as high as 10,000 MPa and typically at least 10 MPa. One useful material for the deflectable portion 46 of the vanes 42 is an injection molding grade resin made from Hytrel having a modulus of elasticity that is consistent over the range of temperature between −40° to 85° C. Other materials are possible. Deflectable vanes 42, within this context, will have a thickness typically no greater than 5 mm and at least 0.25 mm. The deflectable portion 46 is configured to deflect in response to a sufficient air flow rate change through the precleaner arrangement, in use, to affect the pressure drop and efficiency.

The diameter of the ring 40 can depend upon the modulus of elasticity of the vane 42. The diameter of the hub 38 will be no greater than 75% of the diameter of the ring 40 and at least 16% of the diameter of the ring 40.

The precleaner arrangement 24 can be designed to result in desired responses. For example, if it is desirable to affect the shape of the vortex and separation efficiency, the pitches P1, P2, P3, P4 of the vanes 42, 96 can be modified. Other variables to affect vortex shape and separation efficiency include the inner and outer radial gaps 90, 92; the overlap angle 88; the baffle to baffle distance 106, and the scavenge ring diameter 102.

To affect the pressure drop of the precleaner arrangement 24, the following factors can be adjusted; the modulus of elasticity of the vanes 42, 96; the amount of vane deflection; the radius of the hub 38 and ring 40; the vane pitches P1, P2, P3, P4; and the vane overlap 88.

To affect the amount of vane deflection, the following variables can be adjusted: the modulus of elasticity; the vane thickness; the radius of the ring 40; the number of vanes 42; the overlap angle 88; and the vane tilt 77.

The precleaner arrangement 24 can be used in a method of precleaning air. The air to be filtered is directed into an air cleaner assembly 20 at arrow 26. The inlet vane assembly 30 induces vortical air flow, which causes dust or other debris to inertially separate from a remaining portion of the air flow. The vortical air, without at last some of the dust or debris then flows either directly into the main air cleaner 22 or passes through an outlet vane assembly 32.

If passing through an outlet vane assembly 32, outlet vanes will reverse the vortical air flow induced by the inlet vane assembly 30 to substantially straighten or deswirl the air flow. The substantially straightened air flow is then directed to the main air cleaner.

During the step of having the air flow through the inlet vane assembly 30, as the rate of flow increases to higher flow conditions, the inlet vanes 42 will deflect, resulting in a lower pressure drop. The flexing of the vanes 42 will move each adjacent vane 42 in a direction axially away from the next adjacent vane 42, which lowers the pressure drop across the vane assembly 30. When the air flow goes back to a lower flow condition, the inlet vanes 42 will return to their original shape.

The above represents example principles. Many embodiments can be made using these principles.

We claim:

1. A precleaner arrangement for separating a portion of entrained material from air flow air entering an engine air cleaner; the precleaner arrangement comprising:
   (a) a precleaner housing; and
   (b) a plurality of flexible air deflection vanes each with a fixed portion secured to the precleaner housing and a deflectable portion;
      (i) the deflectable portion including a curved section extending from the fixed portion and a tail section extending from the curved section;
      (ii) the fixed portion of the first air deflection vane including opposite straight leading edges and an upper terminal edge extending between the two leading edges;
      (iii) the deflectable portion of the first air deflection vane defining a perimeter including an inner side edge and an outer side edge and a lower terminal edge bridging the inner and outer side edges; each of the inner and outer side edges extending from the fixed portion; the tail section defining the lower terminal edge;
         (A) the curved section having a center of curvature along the inner side edge and a center of curvature along the outer side edge;
   wherein the air deflection vanes are arranged to induce a vortical air flow.

2. The precleaner arrangement of claim 1 wherein:
   (a) the center of curvature along the inner side edge is spaced from the upper terminal edge a greater axial distance than the center of curvature along the outer side edge is spaced from the upper terminal edge.

3. The precleaner arrangement of claim 2 wherein:
   (a) the tail section defines an inner corner at an intersection of the inner side edge and the lower terminal edge, and an outer corner at an intersection of the outer side edge and the lower terminal edge; and
   (b) the outer corner is axially spaced closer to the upper terminal edge than the inner corner is from the upper terminal edge.

4. The precleaner arrangement of claim 1 wherein:
   (a) the precleaner housing has a central hub with a central longitudinal axis passing therethrough; and (b) the lower terminal edge being angled at a non-zero and non-perpendicular angle relative to a plane orthogonal to the central longitudinal axis.

5. The precleaner arrangement of claim 4 wherein:
(a) the tail section defines an inner corner at an intersection of the inner side edge and the lower terminal edge, and an outer corner at an intersection of the outer side edge and the lower terminal edge; and
(b) the outer corner is angled from a plane orthogonal to the central longitudinal axis at a first non-zero angle; and the inner corner is angled from a plane orthogonal to the central longitudinal axis at a second non-zero angle.

6. The precleaner arrangement of claim 5 wherein the first angle and second angle are zero.

7. The precleaner arrangement of claim 5 wherein the second angle is not greater than or equal to the first angle.

8. The precleaner arrangement of claim 7 wherein the first angle and second angle range between 15° and 60°.

9. The precleaner arrangement of claim 5 wherein the first angle is greater than the second angle.

10. The precleaner arrangement of claim 1 wherein:
(a) the tail section has a radial thickness greatest at the inner side edge and decreasing in thickness to the outer side edge.

11. The precleaner arrangement of claim 10 wherein:
(a) the thickness at the inner side edge is up to 10 times the thickness of the outer side edge.

12. The precleaner arrangement of claim 1 wherein:
(a) the precleaner housing has a central hub; and
(b) the flexible air deflection vanes are positioned around the central hub.

13. The precleaner arrangement of claim 12 wherein:
(a) the precleaner housing further includes an outer ring, and each of the flexible air deflection vanes being positioned between the outer ring and the central hub; and
(b) each flexible air deflection vane being secured to the central hub and outer ring at the fixed portion of each vane.

14. The precleaner arrangement of claim 13 wherein:
(a) each of the fixed portions of the of flexible air deflection vanes defines an upper terminal edge; and
(b) each of the deflectable portions of the flexible air deflection vanes defines a perimeter including an inner side edge and an outer side edge and a lower terminal edge bridging the inner and outer side edges; each of the inner and outer side edges extending from the fixed portion; the tail section defining the lower terminal edge.

15. The precleaner arrangement of claim 14 wherein:
(a) an inner radial gap is defined between each of the inner side edges and the central hub; and
(b) an outer radial gap is defined between each of the outer side edges and the outer ring.

16. The precleaner arrangement of claim 15 wherein:
(a) each of the flexible air deflection vanes has a width extending between the inner side edge and outer side edge;
(b) the inner radial gap has a width that is no more than 50% of the width of each vane; and
(c) the outer radial gap has a width that is no more than 50% of the width of each vane.

17. The precleaner arrangement of claim 12 wherein there are at least 6 flexible air deflection vanes.

18. The precleaner arrangement of claim 12 wherein the tail section of each flexible air deflection vane has a variable thickness in a radial direction; a largest thickness being along the central hub and lessening to a portion of the vane next to the outer ring.

19. The precleaner arrangement of claim 12 wherein the plurality of flexible air deflection vanes circumferentially overlap.

20. The precleaner arrangement of claim 19 wherein the overlap is no greater than 60° as measured from the central hub.

21. The precleaner arrangement of claim 1 wherein:
(a) the plurality of flexible air deflection vanes comprises an inlet vane system; and
(b) the precleaner arrangement further includes an outlet vane system downstream of the inlet vane system; the outlet vane system having a plurality of rigid vanes fixed to the precleaner housing.

22. The precleaner arrangement of claim 21 wherein:
(a) the inlet vane system induces a vortical air flow; and
(b) the outlet vane system deswirls the vortical air flow of the inlet vane system.

23. The precleaner arrangement of claim 21 wherein:
(a) the inlet vane system includes a plurality of inlet vane systems within the precleaner housing parallel to each other.

24. The precleaner arrangement of claim 1 wherein:
(a) the deflectable portion is configured to deflect in response to a sufficient air flow rate change through the precleaner arrangement, in use.

* * * * *